Inventor
W. Bartlett Jones,

United States Patent Office 3,391,513
Patented July 9, 1968

3,391,513
SANITARY GRILLWORK
W. Bartlett Jones, 38 S. Dearborn St.,
Chicago, Ill. 60603
Filed June 22, 1966, Ser. No. 559,601
2 Claims. (Cl. 52—667)

The present invention relates to grillwork for sanitary uses formed of spaced wires in positions forming retaining faces of the grillwork, such as planar shelves, planar and curved basket walls, and the like, and in particular, to wires having cross-sections formed only by planar faces of the wires, with the wires so formed and disposed in the grillwork that all the planar faces of the wires are presented to faces of the grillwork and at least two planar faces of the wires are presented to at least one face of the grillwork, whereby said wire faces are readily visible and accessible for cleaning.

Conventionally, round wires are used in forming a wide variety of grillworks commonly used in the household and elsewhere, under conditions such that the wires should be maintained in sanitary condition even though they are subject to being dirtied by food, grease and other contamination. Also some grills for ovens are made of flat ribbons rather than wires. These are readily cleaned, but they tend to sag and lose alinement unless they are appreciably thick, in which case they present lateral faces at right angles to the grill faces.

Grillworks to which the invention pertains are used as shelves in refrigerators, freezers, ovens, dish racks, outdoor barbeque broilers, shopping carts, and to form baskets for refrigerators, kitchen-cabinet doors, automatic dish washers, and for many other fields, for example, bird cages.

The conventional grill wires of circular cross-section, or any wire having a rounded surface, presents difficulties in cleaning. A rounded surface cannot be easily seen fully around its circumference, and cannot be easily rubbed, or scraped with a flat blade. The upper and under faces of round wires in a grill may be cleaned reasonably easily as with a cloth, but not easily scraped. The sides of round wires frequently escape not only the cleaning action but even detection of dirt thereon. Supporting grills made of other than round wires and having planar faces at right angles to the supporting plane are also difficult, not only to clean, but to see where cleaning must be done.

It is the object of the present invention to provide sanitary wire grillwork having spaced grill-faces, using wires of polygonal cross-sections formed only by planar faces of the wires, which wires are so positioned in the grillwork that every planar wire face is presented to a face of the grillwork, and at least two planar wire faces are presented to at least one face of the grillwork.

It is a particular object of the invention to provide such grillwork in the form of planar supporting grills having such wires, which grills are useful as supporting shelves.

By reason of the present invention the polygonal grill wires present every face of the wires at the faces of the grillwork, so that all food and grease or the like on a wire face is always visible, and readily accessible for easy cleaning, especially by scraping.

The invention is illustrated in the accompanying drawings, in which.

Although it is not essential it is preferable that all of the wires form spaced grill planes, each useful as a supporting plane or shelf.

Although the illustrations involve parallel spaced wires, it is to be understood that parallelism is not a limitation of the invention.

Figure 1:
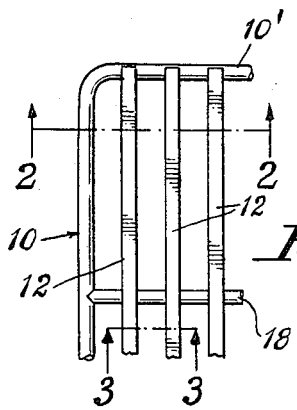
FIG. 1 shows one corner of a rectangular grill used as a refrigerator shelf.
Figure 2:
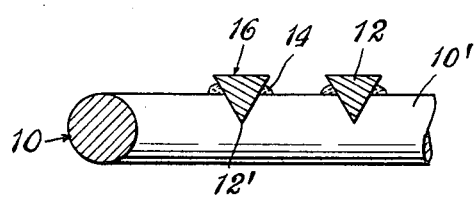
FIG. 2 is an enlarged fragmentary cross-section taken on line 2—2 of FIG. 1.
Figure 3:
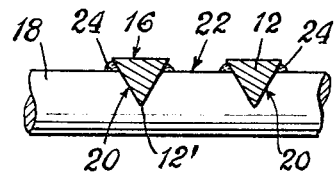
FIG. 3 is an enlarged fragmentary cross-section taken on line 3—3 of FIG. 1.

FIG. 1 shows a corner of a rectangular shelf, such as used in a refrigerator, where the span of the wires is braced by a crossbar. A heavy round rectangular frame of wire 10, shown as round, has grill-forming wires 12 welded to it as shown by weld spots 14 in FIG. 2. Preferably, the frame side 10' is recessed as shown to receive the wires 12. Wires 12 in FIGS. 1–3 are triangular and are positioned with coplanar flat sides 16 forming a face of the grill. Within the frame 10 the grill face formed by said wire faces 16 is unobstructed so that articles may be slid readily over the entire grill in spite of the presence of crossbar 18.

FIG. 3 shows crossbar 18 with V-notches 20 therein of depth to receive less than the whole wire 12, with the top face 22 of the crossbar below the coplanar wire faces 16. Above the bar 18 and below the coplanar faces 16, weld spots 24 secure the wires 12 to the bar.

A grill formed as illustrated in FIGS. 1 to 3 may be inverted to use the shown lower side as a supporting grill in which the edges 12' of the wires are coplanar, when wires of the same cross-section are used, as preferred. The edges 12' can sink into certain articles thereon, for example, meat being broiled, and they prevent easily sliding of articles over the grill crosswise of the wires.

Figure 4:
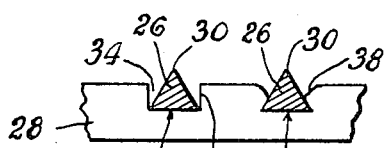
FIG. 4 is a modified form similar to that of FIG. 3 showing one manner of locking wires to a crossbar.

FIG. 4 represents a grill with triangular wires 26 secured to a crossbar 28. The wires 26 have coplanar edges 30 above the bar 28, and their flat faces 32 set originally into a channel-form receiving notch, such as is shown at 34 with side walls 36. The bar at the top of the side walls is then swedged into the notch 34 to lock the wires to the bar as shown at 38.

The grill as presented in FIG. 4 has an unobstructed but ridged face, and it may be inverted to provide a grill of flat faces 32, obstructed, however, by the resulting upstanding crossbar 28.

Figure 5:
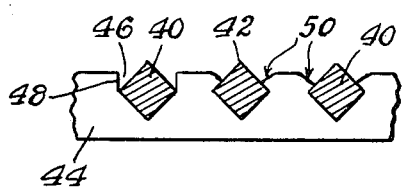
FIG. 5 is a modified form similar to that of FIG. 4 showing wires of a different cross-section.

FIG. 5 is a modified form of the grill shown in FIG. 4, in which the wires 40 have quadrilateral cross-sections, preferably square, with coplanar edges 42 forming an unobstructed but ridged face of the grill. The wires 40 are originally set in a crossbar 44, as in FIG. 4, in a notch 46 conforming to the two lower faces of the wires and with vertical sides 48. The bar at said vertical sides is then swedged onto the upper two faces of the wires, as shown at 50.

The grill of FIG. 5 can be inverted. In the event that grills such as shown in FIGS. 1 to 5 are of such size that no crossbar is provided, both faces of the grills are unobstructed. When there is no crossbar, the two faces of each of the grills of FIGS. 3 and 4 are different, but those of FIG. 5 are similar, and the same, when the wires are square as shown.

Figure 6:
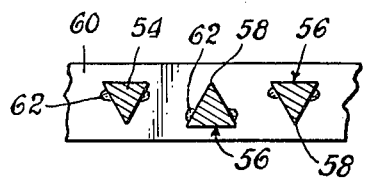
FIG. 6 is a modified form similar to that of FIG. 2 showing a different form of frame and a different arrangement of wires taken on line 6—6 of FIG. 7.
Figure 7:
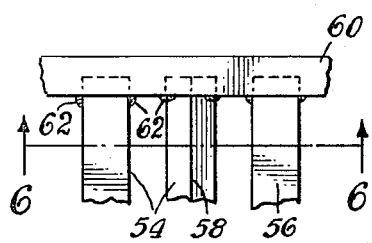
FIG. 7 is a plan view looking down on the structure of FIG. 6.

FIGS. 6 and 7 show a grill in which wires 54 are identically triangular, with alternate wires having coplanar faces 56 forming one grill face, and with the in-between wires having coplanar faces 56 forming the opposite grill face. As a result, each grill face has edges 58 useful to form holding grooves in soft or yielding material supported by the grill, while supporting the articles also by the flat faces. In addition, FIGS. 6 and 7 show one of the frame members 60 for positioning the wires, by entering ends of the wires into the frame members at locations inwardly of the faces of the frame, and securing them as by weld spots 62, so that each face of the grill duplicates the other, when no crossbar is used.

Figure 8:
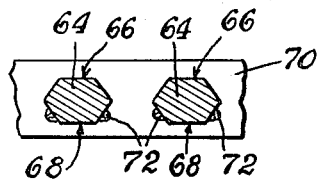
FIG. 8 is a view similar to FIG. 6 showing a modified form of wire.

FIG. 8 is a modified form of the grill indicated in FIGS. 6 and 7, in which the wires 64 are hexagonal with coplanar faces 66 at one grill face and coplanar faces 68 at the opposite grill face. The wires are endwise secured within a frame as in FIGS. 6 and 7 of which frame member 70 is shown, by suitable means, such as spot welds 72.

Figure 9:
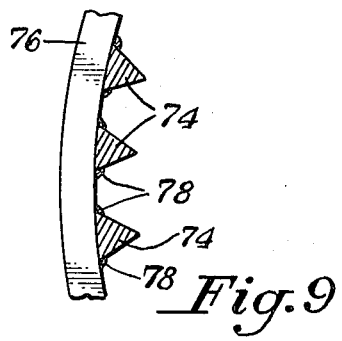
FIG. 9 is a fragmentary cross-section of a curved grill.

FIG. 9 merely illustrates in cross-section a grill having a curved face of wires 74, illustrated as triangular in cross-section, with a curved bracing member 76 as part of the means positioning the wires. The wires are secured to said means in any suitable way, such as by spot welds 78.

All of the grills have wires with all the faces of the wires presented to or at the grill faces. The coplanar faces described are at 0° with the face of the grill. The other faces designedly are not normal to the grill face, in which position dirt therein is difficult to be seen and removed. The slant of the angular faces may vary, but in any event is appreciably less than at 90° with the face of the grill. So presented, each face of the wires is easily seen from a face of the grill and may be easily cleaned by rubbing or scraping, to assure a sanitary condition for which the grill is purposely designed.

Other forms and combinations are contemplated as falling within the scope of the appended claims.

I claim:

1. A grill comprising spaced parallel grill-forming wires in positions forming a planar supporting grill face and an opposite planar grill face, and means securing said wires in fixed positions, said wires having a polygonal cross-section formed only by planar faces of the wires, each planar face of the wires being presented to a face of said grill and being at an angle in the range from 0° to appreciably less than 90° with a grill face, and at least two of said planar faces of the wires being presented to at least one face of said grill, alternate wires having coplanar faces of the same predetermined width in and forming one grill face, the in-between wires having coplanar faces of said predetermined width in and forming the other grill face, and all of the wires having their outermost portions lying in a grill face.

2. A grill comprising spaced parallel grill-forming wires in positions forming a planar supporting grill face and an opposite planar grill face, and means securing said wires in fixed positions, said wires having the same triangular cross-section, each planar face of the wires being presented to a face of said grill and being at an angle in the range from 0° to appreciably less than 90° with a grill face, alternate wires having coplanar faces in and forming a supporting grill face, and the in-between wires having coplanar faces in and forming the other grill face, all of the wires having their outermost portions lying in a grill face.

References Cited

UNITED STATES PATENTS

| | | | |
|---|---|---|---|
| 1,354,998 | 10/1920 | Paulson | 52—667 X |
| 1,665,846 | 4/1928 | Denni | 52—660 X |
| 2,031,007 | 2/1936 | Schulz | 52—667 |
| 2,160,790 | 5/1939 | Swanson | 52—668 |
| 2,477,228 | 7/1949 | Bates | 52—668 X |
| 2,660,102 | 11/1953 | Tarof | 52—666 X |

FOREIGN PATENTS 1,248,488  11/1960  France.

BOBBY R. GAY, *Primary Examiner.*

DAVID J. WILLIAMOWSKY, *Examiner.*

R. D. KRAUS, *Assistant Examiner.*